(12) United States Patent
Brookins

(10) Patent No.: US 6,182,780 B1
(45) Date of Patent: Feb. 6, 2001

(54) MULTIPLE WHEEL DRIVE ASSEMBLY

(76) Inventor: Ernie Brookins, 913 W. Main Ave., West Fargo, ND (US) 58078

( * ) Notice: Under 35 U.S.C. 154(b), the term of this patent shall be extended for 0 days.

(21) Appl. No.: 09/137,468

(22) Filed: Aug. 20, 1998

(51) Int. Cl.[7] .................................................. B60K 17/356
(52) U.S. Cl. ...................... 180/242; 180/243; 74/665 M
(58) Field of Search ...................................... 180/242, 243, 180/308, 6.5, 6.48, 233, 245, 246; 74/665 M, 665 P, 424, 417

(56) References Cited

U.S. PATENT DOCUMENTS

| | | | |
|---|---|---|---|
| 2,900,843 | * | 8/1959 | Zeletzky et al. ...................... 74/665 |
| 3,115,936 | * | 12/1963 | Blews, Jr. .......................... 170/135.2 |
| 3,980,151 | * | 9/1976 | Murayama et al. .................... 180/43 |
| 4,103,753 | * | 8/1978 | Holdeman ............................. 180/49 |
| 4,449,604 | * | 5/1984 | Suzuki ................................. 180/233 |
| 4,962,821 | * | 10/1990 | Kim ..................................... 180/6.48 |
| 5,201,378 | * | 4/1993 | Bamford ............................. 180/6.48 |

* cited by examiner

*Primary Examiner*—Christopher P. Ellis
*Assistant Examiner*—Rashmi Sharma
(74) *Attorney, Agent, or Firm*—David A. Lingbeck

(57) ABSTRACT

A multiple wheel drive assembly including front and wheel axles and four independent gear boxes one for each wheel axle and two intermediate gear boxes each of which is connected to a pair of front and rear wheel axle gear boxes. Each of the gear boxes has a ring gear disposed therein and is capable of effectively reducing the inputted rpms up to eight times and also allows the user to easily adjust the wheel bases to any width and length without having to effect the gear boxes including the ring gears. Each pair of front and rear wheel axles are actuated independently of one another.

7 Claims, 3 Drawing Sheets

MULTIPLE WHEEL DRIVE ASSEMBLY

BACKGROUND OF THE INVENTION

This invention relates to a multiple wheel drive assembly for a utility vehicle such as a skid steer.

Utility vehicles such as skid steers commonly have four wheel drive systems, wherein power is transferred to the front wheels independently of one another and is also transferred to the rear wheels independently of one another unlike passenger and transport vehicles such as automobiles and trucks. Currently, skid-steer types of utility vehicles have at least one elongate gear box extending substantially the length of the frame with a plurality of gears disposed in the oil-filled gear box. A drive shaft powered by the engine actuates the gears in the gear box, of which, in turn, actuates the axles to which the wheels are mounted at a gear reduction of up to fifty to one. This type of drive system is usually limited to a vehicle having just one wheel base length. Any changes to the length of the wheel base would involve changing the gear box and the number of gears therein, a problem not easily solved. In addition, because of the number of gears in the gear box and the oil contained therein, this type of drive system is exposed to many other problems, such as breakage of gears and the difficulty of repairing them and also leakage of oil from the large gear box.

Other types of utility vehicles commonly use chains and sprockets in their drive systems, wherein either the front or rear axles are driven by the drive shaft and the other of which is driven by an endless chain carried about sprockets mounted to the axles. This type of drive system has even more problems than the drive system having at least one large elongate gear box. Because of the herky-jerky motion typical of utility vehicles and the number of moving parts of the endless chains and sprockets, this type of drive system is more easily apt to break down, and the chains tend to stretch which commonly results in the chains slipping about the sprockets, all problems not encountered with by the present drive system.

SUMMARY OF THE INVENTION

The present invention includes a multiple wheel drive assembly which includes a plurality of conventional differential gears with a different differential gear being proximate to each wheel and also with a different differential gear being intermediate to each pair of front and rear wheels, and further includes a plurality of stub axles with one stub axle rotatably extending within each wheel differential gear, and also includes a plurality of drive shafts interconnecting each intermediate differential gear to each pair of respective front and rear wheel differential gears and interconnecting the intermediate differential gears, and further includes a plurality of support members one interconnecting the front wheel differential gears and one interconnecting the rear wheel differential gears for structural support and strength. Each differential gear includes a housing, a pinion gear and a ring gear disposed within the housing.

One objective of the present invention includes a multiple wheel drive assembly which can be quickly and conveniently adjusted to any wheel base size unlike the known prior art.

Another objective of the present invention includes a multiple wheel drive assembly which also strengthens the structural frame of the utility vehicle.

Also, another objective of the present invention includes a multiple wheel drive assembly which is operated essentially with drive shafts rather than gears thus substantially reducing the possibility of breakdowns commonly associated with gears which are more likely to wear out or be stripped than are drive shafts.

Yet, another objective of the present invention includes a multiple wheel drive assembly which costs substantially less than the known prior art and which is virtually maintenance free.

Further objectives and advantages of the present invention will become apparent as the description proceeds and when taken in conjunction with the accompanying drawings wherein:

DETAILED DESCRIPTION OF THE INVENTION

Figure 1:
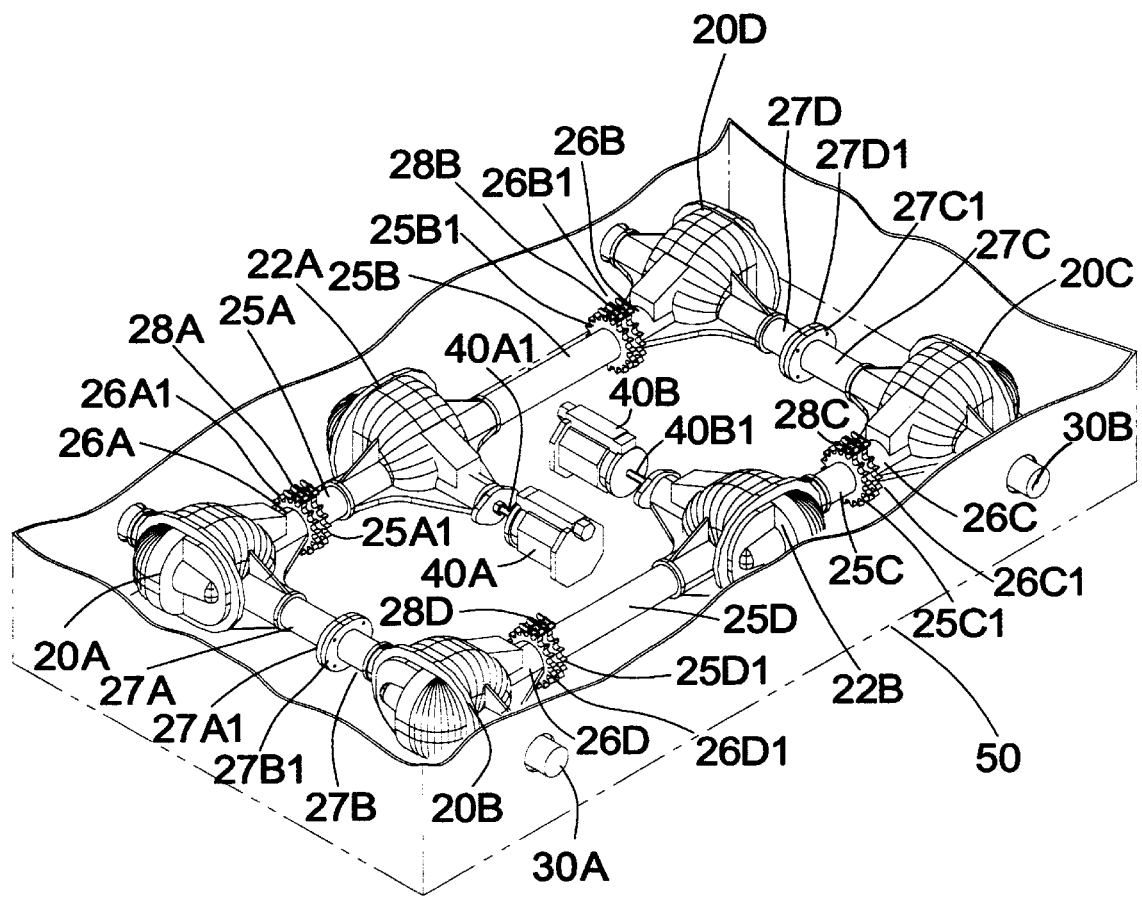
FIG. 1 is a top perspective view of the multiple wheel drive assembly mounted upon the frame of a utility vehicle.
Figure 2:
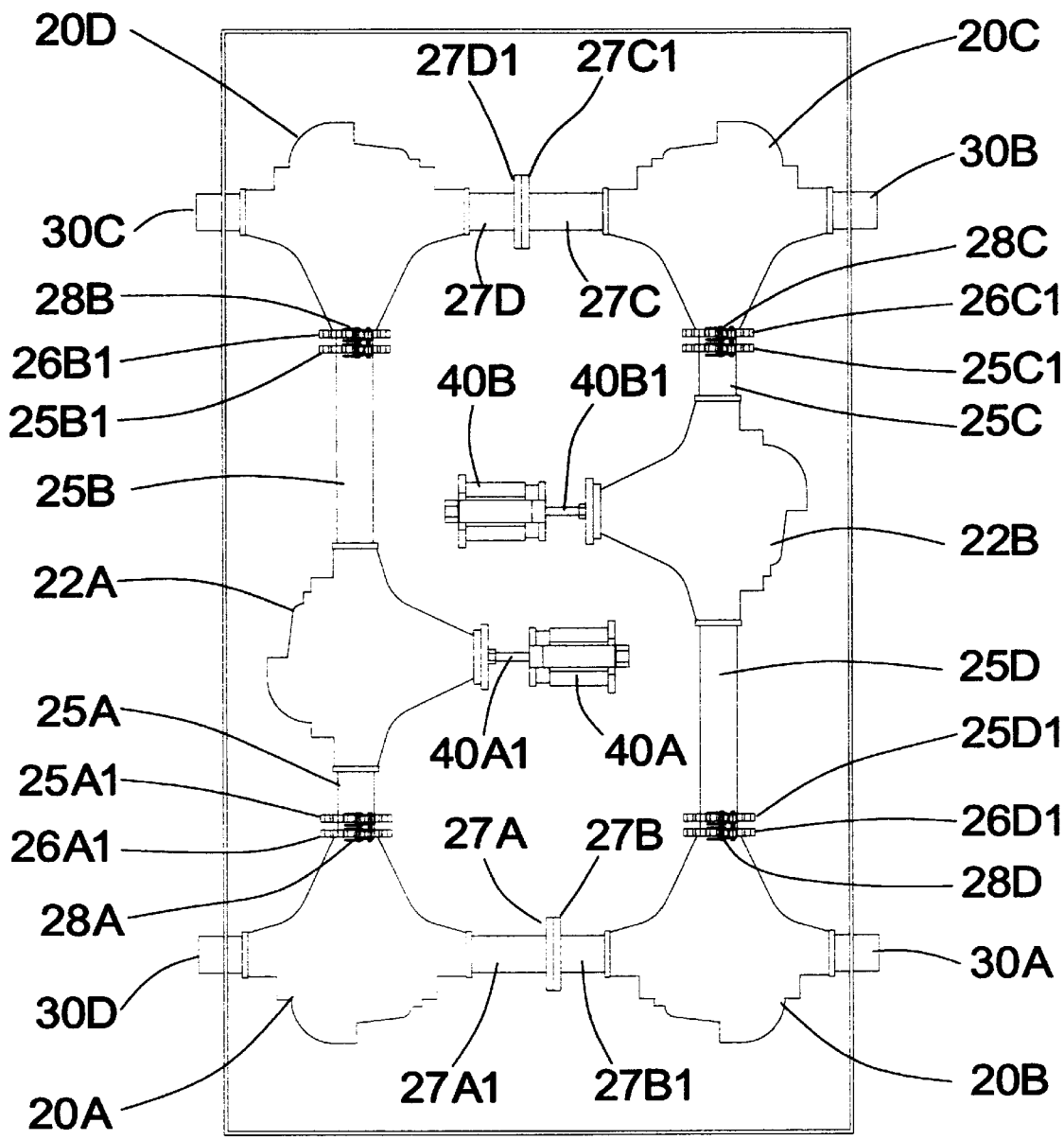
FIG. 2 is a top plan view of the multiple wheel drive assembly mounted upon the frame of a utility vehicle.
Figure 3:
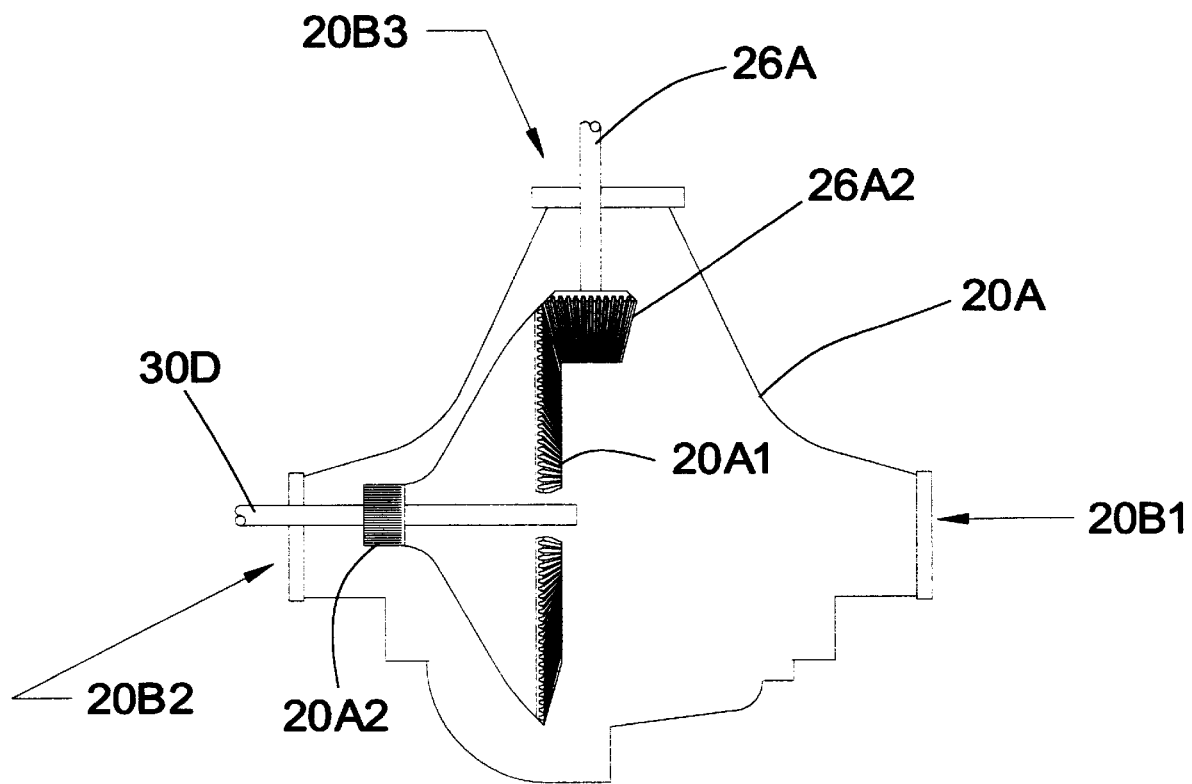
FIG. 3 is a detailed cross-sectional view of a differential gear of the multiple wheel drive assembly.

Referring to the drawings in FIGS. 1–3, in particular, the multiple wheel drive assembly comprises a plurality of conventional gear boxes 20A–D,22A–B each of which includes a housing, a pair of opposed openings 20B1–B2 extending into the housing, a rotatable stub shaft 26A journaled through a bearing (not shown) and extending into the housing through a third opening 20B3 therein at an approximately ninety degrees relative to the pair of opposed openings 20B1–B2 and having a first end disposed outside of the housing with an attachment member 26A1,B1,C1,D1 disposed at the first end and including a conventional knuckle joint or a set of splines and further having a second end disposed inside the housing with a pinion gear 26A2 fixedly attached or welded to the second end. The pinion gear 26A2 is engaged to a ring gear 20A1 which is disposed inside the housing and which has an opening through the center thereof with the opening being defined by a plurality of keyways 20A2 spacedly disposed thereabout. Each wheel axle has its own gear box which operates independently of the other wheel gear boxes. Each wheel axle 30A–D includes a stub axle, a portion of which extends to the outside of the frame 50 and the other portion of which extends inside the frame 50 and through a first one 20B2 of the pair of opposed openings in the respective housing. Each stub axle has a first end which extends inside the respective housing and which is engaged with the keyways 20A2 defining the opening in the ring gear 20A1 for rotation with the ring gear 20A1. The front wheel gear boxes 20C–D are structurally interconnected with a first and second support members 27C–D with each having two ends. One of the ends 27C1 of the first support member 27C is conventionally fastened to one of the ends 27D1 of the second support member 27D with the other end of the first support member 27C extending through the second one 20B1 of the pair of opposed openings in the housing of one of the front wheel gear boxes 20C–D and being conventionally secured therein with fasteners, and with the other end of the second support member 27D extending through the second one of the pair of opposed openings in the housing of the other of the front wheel gear boxes 20D and being conventionally secured therein with fasteners.

The rear wheel gear boxes 20A–B are structurally interconnected with third and fourth support members 27A–B with each having two ends. One of the ends 27A1 of the third support member 27A is conventionally fastened to one of the ends 27B1 of the fourth support member 27B with the other end of the third support member extending through the second one of the pair of opposed openings in the housing of one of the rear wheel gear boxes 20A and being conventionally secured therein with fasteners, and with the other end of the fourth support member 27B extending through the second one of the pair of opposed openings in the housing of the other of the rear wheel gear boxes 20B and being conventionally secured therein with fasteners.

As shown in FIGS. 1–2, in addition to each wheel axle 30A–D having its own gear box 20A–D, there are two additional gear boxes 22A–B with one being disposed intermediate to one pair of front and rear wheel gear boxes and the other being disposed intermediate to the other pair of front and rear wheel gear boxes. Each intermediate gear box 22A–B interconnects the respective front and rear wheel gear boxes 20A–D with rotatable shafts 25A–D, one of the rotatable shafts 25A,25C extending through a first one of the openings in the respective intermediate gear box 22A–B and being engaged in the keyways defining the opening through the ring gear and further having its other end coupled to the conventional attachment member 26A1–D1 of the stub shaft 26A–D for one of the respective front or rear gear box 20A–D, and another of the rotatable shafts 25B,25D extending through a second one of the opposed openings in the respective intermediate gear box 22A–B and being engaged in the opening through the ring gear and further having its other end coupled to the attachment member of the stub shaft for the other of the respective front or rear gear box 20A–D. The ends of all the rotatable shafts which are coupled to the attachment members 26A1–D1 of all the stub shafts are essentially either sets of splines or knuckle joints, and all of the attachment members 25A1–D1 of the rotatable shafts 25A–D are likewise essentially either sets of splines or knuckle joints. The ends of the rotatable shafts 25A,25C which are securely coupled to the attachment members of the stub shafts 26A,26C are essentially splined, and all of the attachment members of the stub shafts 26A,26C are essentially splined also. The attachment members of the rotatable shafts 25A,25C and the stub shafts 26A,26C are coupled together with conventional coupling members which are essentially sleeves 28A,28C having splined ends which are securely engaged to the attachment members 25A1,25C1, 26A1,26C1 of rotatable shafts 25A,25C and stub shafts 26A,26C. The attachment members 25B1,25D1 of the rotatable shafts 25B,25D and the attachment members 26B1, 26D1 of the stub shafts 26B,26D are coupled together with conventional knuckle pins 28B,28D which are securely engaged to the attachment members 25B1,25D1,26B1,26D1 of rotatable shafts 25B,25D and stub shafts 26B,26D. Each intermediate gear box 22A–B is attached to a motor 40A–B such as a hydraulic motor which has a motor shaft 40A1–B1 with a pinion gear attached at the end thereof. The end of the motor shaft 40A1–B1 with the pinion gear is extended through the third one of the openings of the respective intermediate gear box 22A–B, and the pinion gear is engaged to the ring gear disposed inside the respective intermediate gear box 22A–B. The motors are capable of generating 3500 rpms with each gear box designed to reduce the inputted rpms anywhere up to eight times with the rpms at each axle being reduced to approximately 70 rpms. In operation, the motors actuate the ring gears in the gear boxes which, in turn, actuate the rotatable shafts at a substantial speed reduction with the rotatable shafts actuating the ring gears in the wheel axle gear boxes which actuate the wheel axles at another substantial speed reduction. This particular drive assembly allows the user to easily and conveniently change the width and length of the wheel base without having to redesign the drive assembly unlike the prior art by simply changing the length of the shafts interconnecting the gear boxes with the arrangement and number of gears remaining constant.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A multiple wheel drive assembly comprising:
   a plurality of wheel axles including front and rear wheel axles; and
   a means for independent gear reduction for each of said wheel axles and also for each pair of said front and rear wheel axle, said independent gear reduction means further comprising a plurality of wheel axle gear boxes one for each of said wheel axles, each of said wheel axle gear boxes including a housing having first and second opposed openings therein and a third opening, and further including a ring gear disposed inside thereof, each of said wheel axles having an end portion rotatably extending in one of said openings of said housing and being engaged to said ring gear of a respective one of said wheel axle gear boxes for rotation therewith.

2. A multiple wheel drive assembly as described in claim 1, wherein said independent gear reduction means also comprises a plurality of intermediate gear boxes one for each pair of said front and rear wheel axles, each of said intermediate gear boxes including a housing having first and second opposed openings therein and a third opening, and further including a ring gear disposed inside thereof, said independent gear reduction means further including a plurality of shafts having end portions engaged to said ring gears of said intermediate gear boxes through said openings thereof.

3. A multiple wheel drive assembly as described in claim 2, wherein said independent gear reduction means also includes a plurality of stub shafts each of which has a pinion gear disposed at an end thereof and each of which is engaged to said ring gear of a respective one of said wheel axle gear boxes and each of which is coupled to a respective one of said rotatable shafts.

4. A multiple wheel drive assembly as described in claim 3 further comprising a plurality of motors for each of said intermediate gear boxes, each of said motors including a motor shaft having a pinion gear disposed at an end thereof, each of said pinion gears of said motor shafts being engaged to a respective said ring gear of a respective one of said intermediate gear boxes for obtaining gear reduction and actuating said wheel axles.

5. A multiple wheel drive assembly as described in claim 4, wherein a plurality of said stub shafts and a plurality of said rotatable shafts have splined ends and are coupled together with coupling members which are splined sleeves.

6. A multiple wheel drive assembly as described in claim 4, wherein a plurality of said stub shafts and a plurality of said rotatable shafts have knuckle joints which are coupled together with knuckle pins.

7. A multiple wheel drive assembly as described in claim 3, wherein each of said gear boxes is adapted to reduce inputted rpms up to eight times and are structurally and functionally independent of each other.

* * * * *